United States Patent

Rasinski et al.

[11] Patent Number: 5,787,333
[45] Date of Patent: Jul. 28, 1998

[54] AIRCRAFT SURVIVABILITY EQUIPMENT TRAINING METHOD AND APPARATUS FOR LOW FLYERS

[75] Inventors: John E. Rasinski; My Tran, both of Albuquerque, N. Mex.

[73] Assignee: Honeywell Inc., Minneapolis, Minn.

[21] Appl. No.: 756,537

[22] Filed: Nov. 26, 1996

Related U.S. Application Data

[63] Continuation of Ser. No. 297,189, Aug. 26, 1994, abandoned.

[51] Int. Cl.$^6$ .............................. G09B 9/00; G09B 9/08
[52] U.S. Cl. ........................ 434/4; 434/14; 434/35
[58] Field of Search ..................... 342/169; 434/2, 434/3, 4, 5, 14, 35, 37, 38

[56] References Cited

U.S. PATENT DOCUMENTS

| | | | |
|---|---|---|---|
| 4,176,468 | 12/1979 | Marty, Jr. | 434/14 |
| 4,490,117 | 12/1984 | Parker | 434/35 |
| 4,959,015 | 9/1990 | Rasinski et al. | 434/2 |

*Primary Examiner*—Ian J. Lobo
*Attorney, Agent, or Firm*—Kenneth J. Johnson

[57] ABSTRACT

An apparatus and method for aircraft survivability equipment training. The disclosure is particularly directed to the use of such an apparatus and method for multiple player training aircraft with a central controller. The threats are simulated by the central controller and transmitted to each player aircraft via encoded data packets. Additionally, electronic counter measures, counter measures and weapons initiation are simulated. A predictive threat intervisibility engine provides a realistic training situation by predicting each player aircraft's "line of sight" to an updated threat list and local terrain data, as the aircraft travels. Defeated threats are determined by the central controller based on simulated electronic counter measure models, simulated weapon systems activated from weapon controls, simulated counter measures activated by counter measure controls and aircraft dynamic data from the player aircraft's navigation system. A score card is generated for each player and a display is generated utilizing overlaid display symbology of the updated threats, player aircraft positions and local terrain data.

15 Claims, 7 Drawing Sheets

AIRCRAFT SURVIVABILITY EQUIPMENT TRAINING METHOD AND APPARATUS FOR LOW FLYERS

This application is a continuation of application Ser. No. 08/297,189, filed on Aug. 26, 1994, now abandoned.

BACKGROUND OF THE INVENTION

1. Field of the Invention

The invention relates to aircraft survivability equipment (ASE) training and more particularly to a method and apparatus for simulating threats, countermeasures and terrain data, displaying aircraft position data for multiple aircraft, and communicating information between a central control and player aircraft.

2. Background Art

Training of military aircraft pilots for combat conditions is as important as the mechanical and electrical components aboard the aircraft. The use of simulated threats for training pilots has been utilized in various fashions in an attempt to effectively train pilots for readiness for actual combat conditions.

Initially, radar threats were simulated using ground-based emitters over which the trainee-pilot would fly to simulate enemy threats. These implementations were inflexible and labor intensive. Additionally, these simulations were not realistic because although a threat had been eliminated the threat was still active, i.e., the radar was still transmitting. Secondly, there was no automatic way to correlate the electronic countermeasures, initiation of countermeasures, and player evasive maneuvers against the active threats to evaluate and record results.

Other attempts to provide more realistic in-flight training have met with limited success because they did not take multi-players against common threats into account. These systems have the disadvantage of not being interactive by not correlating threat data with pilot actions via onboard training equipment.

U.S. Pat. No. 4,959,015 to Rasinski, et al., discloses a simulator for in-flight threat and countermeasures training using existing aircraft control and display systems. The simulator is a self contained system for training a single pilot for a multiple threat scenario. The present invention has significant improvements over this system. The present invention teaches an apparatus and method for realistic multiple aircraft player training. Threat status and mode of operation for each threat in the threat scenario training setup are constantly evaluated and updated by an airborne central training apparatus. The system is configured to access the digital terrain elevation data memory module for realistic training. Threats are removed from the active list and tagged from the threat scenario when they are defeated or destroyed, and the results of the exercise can be objectively determined from data provided by player aircraft and specific active threats. None of the prior art systems disclose these novel features.

Previous art was designed for high flying aircraft where the terrain did not obstruct the line-of-sight from simulated threats to the aircraft involved in training. For low flying aircraft including helicopters and some fighters, the terrain is used for masking oneself from threats, making the training provided by the previous art unrealistic.

The present application addresses this deficiency by placing a master training controller computer in an aircraft flying well above the terrain. This aircraft has a terrain data base memory module and means for digitized two way communication with training aircraft. Simulated threats are positioned within the training area, defined by the boundary of the digital terrain database, and reside in the master controller. Training aircraft with covert options periodically transmit their position, altitude, altitude rate, attitude, attitude rate, speed, electronic countermeasure (ECM) techniques, and weapons mode states to the master controller. A process within the master controller computer determines when a simulated threat would be able to engage training aircraft (given terrain masking considerations) based on the threat model and tactics, and sends a message to the training aircraft which, in turn, causes an appropriate threat symbology to be displayed and a high fidelity audio warning about the nature of the threat to be generated. The master controller also evaluates the result of the encounter given the action of the trainee, that is, action of ECM equipment, initiation of counter measure (CM) equipment, initiation of weapons systems, terrain masking and evasive maneuvers, and continuously updates the threat messages to the training aircraft to reflect the current training situation. Smart strategies, such as stroking or on-off tracking, are incorporated into the training scenario to make the training even more realistic. Threats, as simulated within the master controller computer, are also responsive to smart attached tactics on the part of the trainees, responding accordingly, adding yet an additional element of realism. Operation of the threats per se is completely transparent to crews of the low flying aircraft that are undergoing training.

SUMMARY OF THE INVENTION

The present invention relates to a method and apparatus for aircraft survivability equipment training. The technology herein described is a realistic training platform because it can utilize multiple aircraft and contains terrain data for "line of sight" targeting strategies for low flyers.

In accordance with the present invention, there is provided an apparatus for aircraft survivability equipment training comprising a central training control for creating and transmitting simulated threat scenarios and for monitoring each player aircraft's reaction to the simulated threat scenarios and at least one player aircraft for receiving the threat scenarios from the central training control and for transmitting the at least one player aircraft's reactions.

The preferred simulated threat scenarios comprise threat models, threat tactics and terrain data.

The preferred central training control further comprises a predictive intervisibility engine for correlating the at least one player aircraft positional data and the simulated threat scenarios. The preferred central training control further comprises an apparatus for prioritizing simulated threats for the at least one player aircraft. The preferred central training control also comprises a training initialization structure for setting up the central training control and the at least one player aircraft for a training mission.

The central training control preferably comprises a display for a training situation. The preferred display comprises an apparatus for overlaying display symbology of the at least one player aircraft position, updated threats, and local terrain data.

The central training control preferably comprises a training scorecard generator.

The preferred structure for monitoring the aircraft reactions comprise structure for monitoring aircraft dynamic position and measures initiated by the at least one player aircraft. The measures initiated by the at least one player aircraft preferably comprise simulated counter-measures, simulated electronic counter-measures and simulated weapons initiation.

The preferred method for aircraft survivability equipment training comprises the steps of providing a central training control apparatus, comprising the substeps of creating simulated threat scenarios, transmitting the simulated threat scenarios and monitoring each player aircraft's reaction to the simulated threat scenarios, and providing at least one player aircraft, comprising the substeps of, receiving the threat scenarios from the central training control apparatus and transmitting the at least one player aircraft's reactions.

The preferred step of creating simulated threat scenarios comprises providing threat models, threat tactics and terrain data. The method further comprises correlating the at least one player aircraft's positional data with the simulated threat scenarios utilizing a predictive intervisibility engine. The method also comprises prioritizing simulated threats for the at least one player aircraft.

The step of providing the central training control comprises setting up the central training control and the at least one player aircraft for a training mission utilizing a training initialization apparatus.

The step of providing a central training control preferably comprises displaying a training situation. The step of displaying a training situation comprises overlaying display symbology of the at least one player aircraft's position, updated threats, and local terrain data.

The step of providing a central training control also comprises generating a training scorecard.

The preferred steps of monitoring and transmitting player aircraft reactions comprises monitoring and transmitting the at least one aircraft's dynamic position and measures initiated by the at least one player aircraft.

The measures initiated by the at least one player aircraft comprise simulated counter-measures, simulated electronic counter-measures and simulated weapons initiation.

The in-flight aircraft survivability equipment training apparatus for multiple player aircraft comprises a central control apparatus comprising an apparatus for transmitting simulated threat scenarios to each player aircraft and for receiving each player's aircraft dynamic and pilot reaction data, structure for interactively correlating the simulated threat scenarios and the received data from each player aircraft, structure for tracking simulated threats for active/inactive status in conjunction with each player aircraft's position and the pilot reaction data, an apparatus for interactively updating the threat scenarios based on the simulated threat status and the each player position, and an apparatus for archiving each player's results, and at least one player platform comprising structure for transmitting aircraft navigational data and pilot reaction data to the central control apparatus, and structure for receiving the threat scenario from the central control apparatus.

The preferred simulated threat scenarios further comprise terrain data.

Also disclosed is a method for in-flight aircraft survivability equipment training for multiple player aircraft comprising the steps of providing a central control apparatus comprising transmitting simulated threat scenarios to each player aircraft, receiving each player aircraft's dynamic and pilot reaction data, interactively correlating the simulated threat scenario and received data from each player aircraft, tracking simulated threats for active/inactive status in conjunction with each player aircraft's position and the pilot reaction data, interactively updating the threat scenarios based on the simulated threat status and each player aircraft's position, and archiving each player aircraft's results, and providing at least one player platform comprising transmitting each player aircraft's navigational data and pilot reaction data to the central control apparatus, and receiving the simulated threat scenarios from the central control apparatus.

Provided is a central training control apparatus for aircraft survivability equipment training comprising a mass memory unit comprising training data, terrain elevation data and threat tactic selection data, an input datalink for receiving aircraft dynamic data, electronic counter-measures, counter-measures and weapons data from each player aircraft, a predictive intervisability engine for correlating data from the mass memory unit and the input datalink for each player aircraft, an apparatus for determining active threats for each player aircraft from the predictive threat intervisability engine, an apparatus for prioritizing the active threats for each player aircraft, an apparatus for interactively updating the active threats by deleting defeated threats, an output data link for transmitting updated active threat data to each player aircraft, a training situation display and a training scorecard generator.

The preferred training data comprises aircraft survivability equipment configuration and threat scenarios.

Disclosed is a training platform for player aircraft for an in-flight aircraft survivability equipment training apparatus comprising an input data link for receiving threat files and training setup data, a display for displaying threats from the threat files, an apparatus for controlling power to counter-measure and weapons systems from the training setup data, structure for setting up weapons systems configuration from the training setup data, an apparatus for simulating electronic counter-measure models from the training setup data, a weapons simulator controlled by the training setup data, a counter-measure simulator, and an output data link for transmitting the simulated electronic counter-measure models, simulated weapons systems, simulated counter-measures and aircraft dynamic data from a player aircraft navigation system.

Provided is a method for centrally controlling aircraft survivability equipment training comprising the steps of providing a mass unit comprising providing training data, terrain elevation data and threat tactic selection data, receiving aircraft dynamic data, electronic counter-measure, counter-measure and weapons data from each player aircraft via input data link, correlating data from the mass memory unit and the input datalink for each player aircraft comprising a predictive threat intervisibility engine, determining active threats for each player aircraft from the predictive threat intervisability engine, prioritizing the active threats for each player aircraft, interactively updating the active threats by deleting defeated threats, transmitting updated active threat data to each player aircraft via an output data link, displaying a training situation and generating a training scorecard.

The preferred step of providing training data comprises providing ASE configuration and threat scenarios.

Disclosed is a method for in-flight aircraft survivability equipment training for player aircraft pilots comprising the steps of receiving threat files and training setup data via input data link, displaying threats from the threat files, controlling power to counter-measure and weapons systems from the training setup data, setting up weapons systems configurations from the training setup data, simulating electronic counter-measure models from the training setup data, simulating weapons systems by the training setup data, simulating counter-measures and transmitting the simulated electronic counter-measure models, simulated weapons systems, simulated counter-measures and aircraft dynamic data from a player aircraft navigation system.

Provided is an in-flight ASE training apparatus for multiple player aircraft comprising a central control apparatus comprising a mass memory unit comprising training data comprising a training initialization apparatus, ASE configuration and threat scenarios, digital terrain elevation data, and threat tactics comprising selected threat models and threat stratagem and a player aircraft identification apparatus, an input data link comprising player aircraft dynamic data and training platform data comprising player aircraft evasive maneuvers, electronic counter-measures, counter-measures and weapon modes and a predictive threat intervisibility engine for determining generic threats, an apparatus for determining active threats per player aircraft, an apparatus for prioritizing the active threats per player aircraft, an apparatus for updating active threats per player aircraft and for recording defeated threats, an output data link for transmitting encoded updated threats to each player aircraft, the ASE configuration and a display symbology generator for generating symbology for a position of each player aircraft and updated threats, a training situation display for displaying overlaid symbology from the display symbology generator and the digital terrain elevation data and a training scorecard generator for defeated threats for each player aircraft, and a training player platform for each player aircraft comprising a player input data link comprising the updated threats and the ASE configuration, a power controller for controlling power to onboard player counter-measures and weapon systems by the input data link, a threat symbology generator for generating symbology for the updated threats via the input data link, an audio warning generator for generating audio warnings from the updated threats via the input data link, an electronic counter-measure model simulator initiated controlled by the ASE configuration, a weapons system simulator initiated by the ASE configuration and controlled by a weapon controller, a counter-measure simulator initiated and controlled by a counter-measure controller and a player output data link for transmitting electronic counter-measure mode data from the electronic counter-measure model simulator, weapons systems mode data from the weapons systems generator, counter-measure mode data form counter-measure simulator and aircraft dynamics data from the player aircraft navigation system.

A primary object of the present invention presents a realistic real time aircraft survivability equipment training apparatus and method.

Another object of the present invention is to provide training for multiple player aircraft.

Yet another object of the present invention is to objectively determine the success or failure of each player pilot during a training mission.

The primary advantage of the present invention is that it is significantly less expensive than existing systems.

Another advantage of the present invention is the use of terrain data as an additional factor in training missions which is especially significant for low flying aircraft.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS

Figure 1:
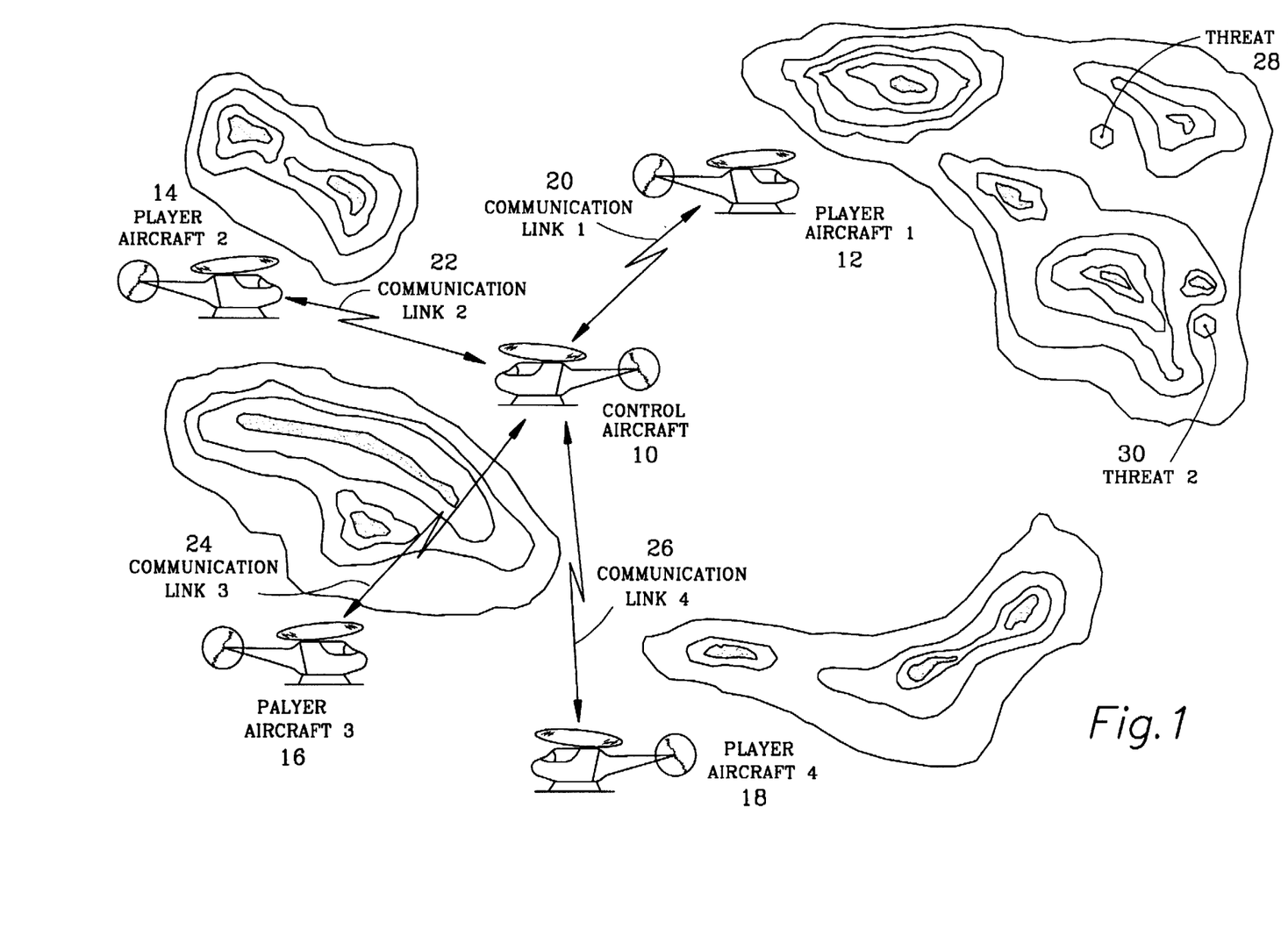
FIG. 1 is a pictorial depiction of a threat scenario of the preferred embodiment of the present invention.

FIG. 1 is pictorial depiction of a training scenario of the preferred embodiment of the present invention. Central training control is aboard control aircraft 10 and is stationed above player aircraft 12, 14, 16 and 18. Communication links 20, 22, 24 and 26 between central control aircraft 10 and player aircraft 12 provide player dynamics situations along with status of aircraft survivability equipment, weapon systems and threat situation per individual player to and from central control aircraft 10. Threats 28 and 30 can be positioned within the simulator as indicated. In the scenario player of FIG. 1, player aircraft 12 would be unable to "see" threat 28 until reaching a line of site over the simulated terrain data.

The two major components of the preferred embodiment are the master controller and the player control apparatus. Each player aircraft 12 will have a single player control apparatus. The system can be configured for several player control apparatuses operating simultaneously with one master controller.

Figure 2A:
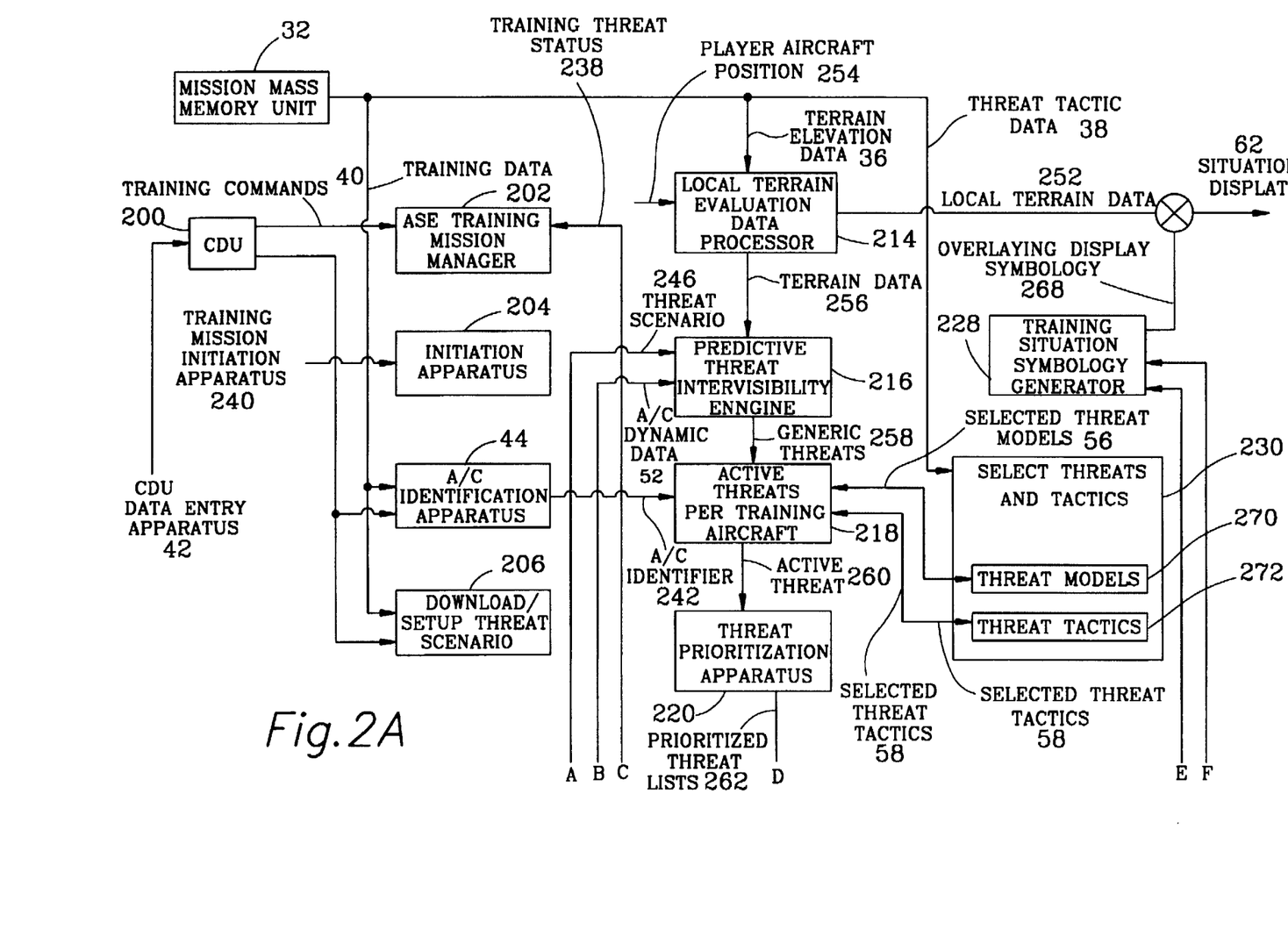
FIGS. 2A and 2B schematically illustrate a preferred block diagram of the central training control apparatus in accordance with the invention.
Figure 2B:
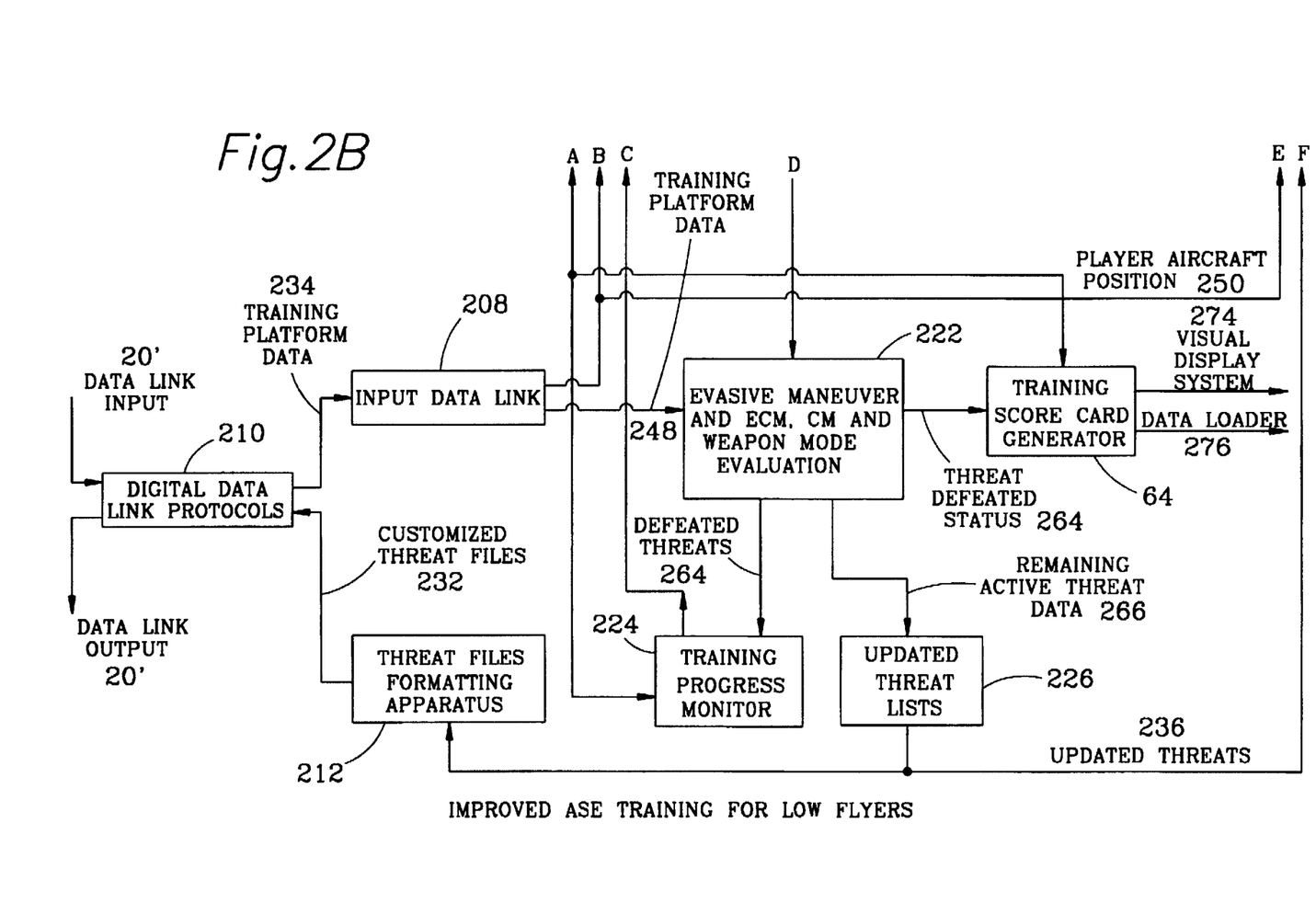

FIG. 2 is a block diagram for the preferred central training control apparatus and method. Mission mass memory unit 32 contains training data 34, terrain elevation data 36 and threat tactic data 38 in digital form. This data can be stored in erasable programmable read-only memory (EPROM), random access memory (RAM) or in other storage forms that are well known in the art.

Control display unit (CDU) 200 is a means to manually enter signals to change certain aspects of a simulation such as the training configuration, threat tactics, threat configuration and threat scenario. This data can be entered via CDU data entry apparatus 42, which can comprise a keyboard or other data entry apparatus known in the art. In addition, CDU 200 can manually configure aircraft identification codes for each player aircraft 12. The output from CDU 200 transmits training commands 40 to the ASE training mission manager 202. In addition, CDU 200 has output signal line for training mission initiation 240 via initiation apparatus 204, download/setup ASE configuration and A/C identification apparatus 44, and download/setup threat scenario apparatus 206.

Digital data link protocol 210 receives data via data link input 20' containing encoded data packets with information from player aircraft 12 such as player aircraft dynamic position, including heading, speed, altitude, altitude rate, pitch attitude, pitch attitude rate, role attitude and role attitude rate. In addition, data is received via data input link 20' on weapon mode and status data, ECM mode and technique for each particular threat and CM initiation mode from each player. Data output link 20 from digital data link protocol 210 provides unique encoded threat data to each player aircraft 12 for the training mission. Output from digital data link protocol 210 is data from the training platform 234 providing data pertaining to each participating aircraft to the input data link 208. Input to digital data link protocol 210 via customized threat rules 232 contains customized threat files that contain a customized active threat list for each player aircraft 12.

The ASE training mission manager receives training commands such as when training should start, continue or end. This is done by a manual command from CDU 200 via training commands 40 or from training progress monitor 224 via training threat status 238.

Initialization apparatus 204 checks out the system by probing all systems and subsystems to determine their function or status and determine whether all systems are in go state. This initiation apparatus determines the status and function of each system and subsystem prior to the training mission start. Initiation apparatus 204 contains a single input, initiate training mission 240, which signal triggers the system.

Download/setup ASE configuration and A/C identification 44 sets up a training configuration for each player aircraft 12. For example, aircraft number one may have a radar warning receiver and a pulsed radar jammer, and aircraft two may be configured differently with the addition of a missile approach detector and a CW radar jammer. This apparatus 44 configures each of the player aircraft 12 appropriately, either by preprogram from mass memory unit 32 or by manual entry from CDU 200. In addition, a unique identification code is assigned to each player aircraft 12 via downloaded training data 34 or by manual data entry from CDU 200 via setup training data 240. Output from apparatus 44 is ASE configuration and A/C identification 242 to active threats per training aircraft 218. One important aspect of this invention is the ability to update or change parameters via CDU 200 during the training mission.

Download/setup threat scenario apparatus 206 takes threat data produced from mass memory unit 32 and updated from CDU 200 to provide a complete threat scenario for training. Output from download/setup threat scenario apparatus 206 is threat scenario 246 which is sent to predictive threat intervisibility engine 216 and also to training progress monitor 224.

Input data link 208 separates data from each identified player platform, unpacks the data and distributes aircraft dynamic data, i.e., position, heading, speed, altitude, altitude rate, pitch, pitch rate, role, role rate, heading and speed via A/C dynamic data 52 to predictive threat intervisibility engine 216. The input data link 208 also provides ECM, CM and weapon mode and status data via training platform data 248 to evasive maneuver and ECM, CM and weapon mode evaluation apparatus 222. In addition, aircraft identification and positional data for each player aircraft 12 are transmitted via player aircraft positions 250 training situation display symbology generator 228.

Threat files formatting apparatus 212 takes updated threats 236, packages the data and sends it via customized threat files 232 to digital data link protocol 210 for transmission.

Local terrain elevation data apparatus 214 inputs preprogrammed digitized terrain elevation data 36 from mass memory unit 32. This preprogrammed data is data from a source such as satellite data collected for the location of the training mission. Also provided as input to local terrain elevation data apparatus 214 is aircraft position 254 so that the terrain data will change as player aircraft positions change. Output from local terrain data apparatus 214 is local terrain data 252 which is input to training situation display system 62. In addition, terrain data 256 is input to the predictive threat intervisibility engine 216.

Predictive threat intervisibility engine 216 is a component that projects player aircraft positions and, based on each player's position, determines visibility between the player aircraft 12 and the planned threat. In addition, this component takes into account delay times due to data transmission and receipt. This structure 216 creates this information from terrain data 256, threat scenario 246, and A/C's dynamic data 52. The generic threats 258 output generates all possible threats visible to the particular player aircraft 12.

Active threats per training aircraft 218 is a structure that realistically determines the active status of each individual threat to each player aircraft 12 to provide threat type, threat mode and status, i.e., whether the threat is old or new. Inputs to the active threats per training aircraft 218 are generic threats 258, ASE configuration and A/C identification 242, selected threat models 56, and selected threat tactics 58. Active threat output 260 is provided to threat prioritization 220.

Threat prioritization 220 provides set priorities for each individual threat. Input to threat prioritization 220 is active threats 260. The prioritization is based on predetermined rules used by the aircraft survivability equipment. The output of threat prioritization is prioritized threat lists 262.

Evasive maneuvers and ECM, CM and weapon mode evaluation apparatus 222 determines evasive maneuvers and initiation of simulated ECM, CM and weapons based on training platform data 248 and correlated with the prioritized threat list 262. Training platform data 248 contains evasive maneuver data ECM, CM and weapon mode and when correlated with the prioritized threat lists provides threat defeat status 264 and defeated threats 269. Defeated threats 264 is input to training progress monitor 224 and threat defeated status 264 is input to training score card generator 64. In addition, an output is generated for the remaining active threats data 266.

The remaining active threat data 266 is fed to updated threat list 226. This structure provides overall threat status for each individual player and performs a temporal correlation to provide threat status, i.e., new or old. The output from updated threat lists 226 is updated threats 236, which is fed to format threat files for transmission 212 and to training situation display symbology generator 228.

Training progress monitor 224 is a structure that keeps track of how many threats remain in inventory. The inventory is determined by correlating defeated threats 264 with threat scenario 246. Training progress monitor 224 provides on-going training progress status to ASE training mission manager 202 via training threat status 238.

Threat symbology display generator 228 generates symbology for each of the threats based on updated threats 236 and also generates symbology for each individual player aircraft 12 based on player A/C position 250. The generated symbols are overlaid over the local terrain data 252 to create a video presentation for the training situation display 62.

Selected threats and tactics 230 contains two internal components, threat models 270 and threat tactics 272. Threat models 270 and threat tactics 272 are contained in internal memory. Selection of a threat from threat models 270 and threat tactics 272 is based on threat tactic selection 38 from the mass memory unit 32. Output from threat models 270 is selected threat models 56 and output from threat tactics 272 are selected threat tactics 58 which are fed to active threats per training aircraft 218.

Training scorecard generator 64 is a structure that keeps track of the success rate against planned threats for each player aircraft 12. Input to the training scorecard generator 64 are defeated threats 264 and threats scenario 246. The two outputs from the training scorecard generator are the visual display system 274 and data loader 276 for storage of mission data for later review and briefing.

Figure 3:
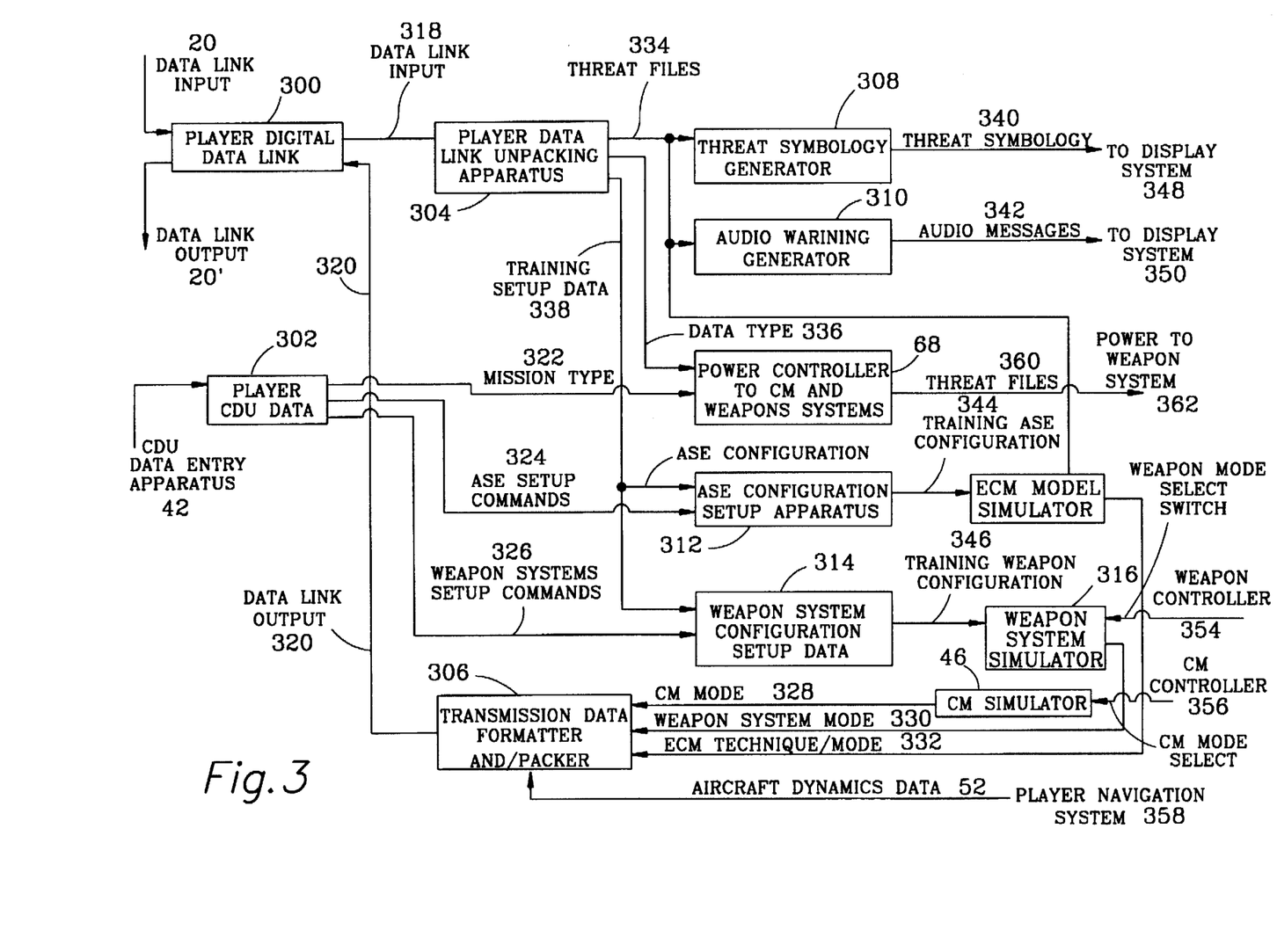
FIG. 3 is a block diagram of the preferred player aircraft training platform.

FIG. 3 is a block diagram for the preferred training platform. Digital data link 300 is a communication structure to receive and transmit data to and from the center training control. Data link output 20' transmits data from the player aircraft 12 including aircraft dynamic data, mode and initiation of CM, ECM and weapon systems to central training control. Data link input 20 contains a track file indicating active threats transmitted by central training control to each player aircraft 12. Once the data is received from data link input 20 to digital data link 300 the data is distributed via data link input 318 to data link data unpacking apparatus 304. In preparation of transmission of data to central training control data link output 320 is fed into digital data link 300.

Player CDU data apparatus 302 is a structure for manual entry of data. This is a redundant apparatus for an operator to choose either a training mission operation or normal operation. This is in addition to initialization for training mission operation as transmitted to each player aircraft 12 by central training control. In addition, the player CDU data entry apparatus 302 can be used to override data from the central control aircraft 10 or to change the ASE configuration. For example, a trainee may wish to simulate an emergency situation such as equipment malfunction or other similar occurrence. Data is entered via CDU command entry 42, such as a keyboard. Outputs from the player CDU data apparatus 302 are mission type 322 to control power applied to CM and weapon systems 68, setup ASE configuration 312 via ASE setup commands 324, and weapon setup system configuration 314 via weapon system commands 326.

Data link unpacking apparatus 304 is a structure that unpacks or separates the data from the data link input 318 into threat data, weapons configuration and ASE configuration. Output from the data link unpacking apparatus 304 are threat files 334 to threat symbology generator 308 for visual display and audio warning generator 310 and ECM model simulator 84. Data type 336 is fed to control power to CM and weapon systems 68. A third output, training setup data 338 is sent to ASE configuration setup apparatus 312 and also to weapon system configuration setup apparatus 314.

Data transmission packer and formatter 306 operates inversely from receiving data link data apparatus 304. Inputs to data for transmission packer and formatter 306 are CM mode 328, weapon system mode 330, and ECM technique/ mode 332 along with aircraft dynamic data 52. This data is packed for transmission via data link output 320 to digital data link protocol 300 and transmitted via data link output 20' to central training control.

Threat symbology generator 308 takes threat data 334 and creates symbology and threat display placement to represent active threats and is sent via threat symbology 340 to display system 348.

Audio warning generator 310 takes the threat data 334 and creates an audio warning for the active threats such as different tones for different type threats. The audio message 342 is transmitted to audio system 350.

CM power and weapon system power control 68 processes data or messages indicating whether this is a training mission or normal operation. This apparatus provides control power to bypass actual dispersing of CM and deactivates weapon systems through CM and weapon system control 360 to power CM and weapon systems 362. The inputs to CM and weapon power control system 68 are receiving data link unpacking apparatus 304 via data type 336 for remote operation, or from CDU data 302 via 332 for manual entry.

ASE setup configuration apparatus 312 sets up the training ASE configuration. Inputs for this apparatus are training setup data 338 for remote operation and ASE commands 324 for manual operation. The output from the ASE configuration setup apparatus 312 is training ASE configuration 344 to the ECM model simulator 84.

Weapon systems configuration setup apparatus 314 determines which weapon systems are to be simulated. This can be done remotely via training setup data 338 or manually via weapon system setup commands 326. Output from the weapon systems configuration setup apparatus 314 is training weapons configuration 346 which is sent to weapon systems simulator 316.

ECM model simulator 84 takes threat files 334 and training ASE configuration 344 to determine which model ECM is to be activated. For example, simulated activations of CW jammers and/or pulsed radar jammers can be simulated to jam some of the threats. This data, ECM technique/ mode 332 is sent to data packer and formatter 306 for packing and transmission.

Weapons simulator 316 takes training weapons configuration 346 based on internal weapon models and from the pilots initiation of weapon controls via weapon mode select 352 from weapon control 354 to produce weapon system mode 350 which is also sent for formatting and transmission. The weapon control 354 can be activated from a standard grip control or a series of push buttons for weapon mode activation.

CM simulator 46 takes a manual initiation data from CM control 356 via CM mode select 364 to indicate whether RFO decoy, chaff, or flares have been initiated by the pilot from CM control 356.

It is important to note that aircraft that are equipped with weapon systems or CM systems are simulated by pressing the same buttons or keys for activation while the actual systems are bypassed. Additionally, even if the player aircraft 12 is not equipped with certain weapon systems, the simulations can be produced by providing a keyboard or switches for the simulation. Therefore a pilot can be trained for weapons and CM systems although the aircraft is not outfitted with this equipment.

In operation, a training instructor determines the scope of the training mission, for example 5 player aircraft and 30 threats. Threat tactics and terrain elevation parameters are selected. This data will be preprogrammed from a ground base station and contained in the mass memory unit aboard the central control aircraft 10. Alterations or additions to this data can be made through the CDU data entry apparatus.

Figure 4:
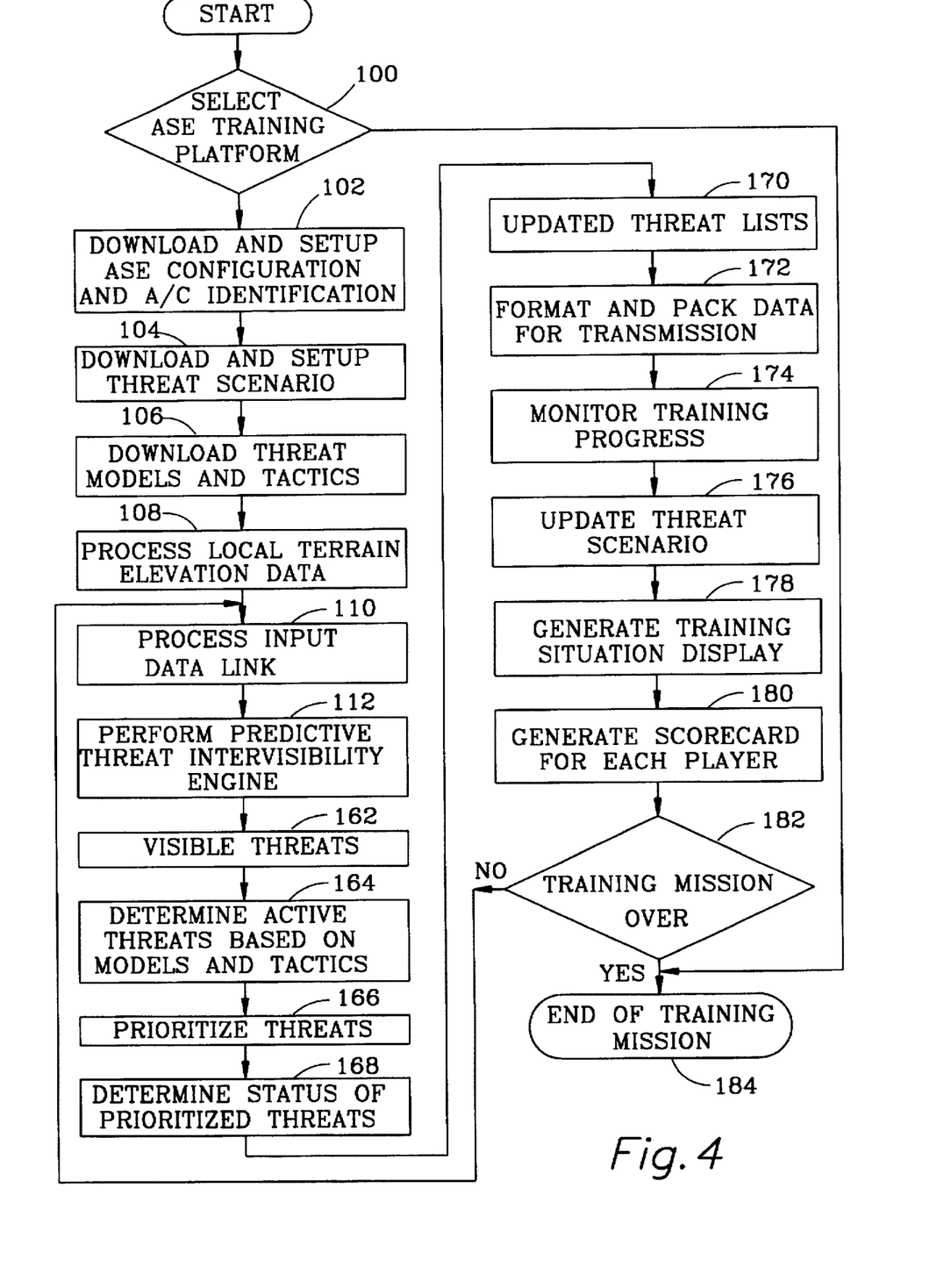
FIG. 4 is a flow chart illustrating the preferred method of the central training control.

The preferred method of the invention for the central control aircraft 10 is shown in FIG. 4. The first step in an ASE training mission is determining an ASE training platform 100, based on command executed on the CDU training page. This step includes signaling to deactivate onboard weapons systems aboard player aircraft 12 and enabling simulators for CMs, ECMs and weapon systems. The pilot will initiate the same commands and controls as if an actual encounter was taking place or can simulate activations of these systems by keystrokes or by turning on switches on a "black box". The control power for the CM's, ECM's and weapon systems are set up by the data link. Once the ASE training platform 100 is selected and unique identity codes for each player are designated, the ASE configuration and identity codes for each of the 5 player aircraft are downloaded 102. The threat scenario for the 30 threats is then downloaded 104 from the mission mass memory data unit. The threat scenario is a preprogrammed scenario selected from a menu. The threat scenario selection process includes selecting the number of threats, location of threats and type of threats. The threat scenario can be modified by manual entry from a CDU command entry unit.

The next step is downloading of threat models and tactics 106 for the selected threats. The threat models are simulated radar threats corresponding to actual radar transmissions. Threat tactics can include strobing, tracking on/off movement of the threat and use of slight variations of radar frequency for a threat.

The next step is processing local terrain and elevation data 108. This data 108, as an example, can consist of local terrain data in FIG. 1, which provides digitized terrain elevation coverage for all the player aircraft to each player aircraft's "line of sight". The local terrain data will be fed into the master controller through the small computer system interface (SCSI). The terrain data is managed and updated to include corresponding terrain as the player aircraft moves. The range for the training area is about 100 miles radius.

Processing the input data link 110 is the next step in the progression. This step processes the data from each of the player aircraft which includes navigation data as well as CM, ECM and weapons data. The aircraft navigation data includes its heading, speed, altitude, altitude rate, pitch, pitch rate, roll, and roll rate. This data can be obtained from the Inertial Navigational System (INS) and the Global Positioning System (GPS) aboard each player aircraft. The CM, ECM and weapons data is generated by manual and automatic actuations from the player aircraft and simulated by models. This data from each of the player aircraft is contained in encoded data packs and transmitted to the central training control aircraft 10.

The predictive threat intervisibility engine 112 is then performed interactively for each player aircraft. This step involves estimating communication delay times and uses the transmission delay time with aircraft dynamic factors to predict the position of the player aircraft.

Figure 5:
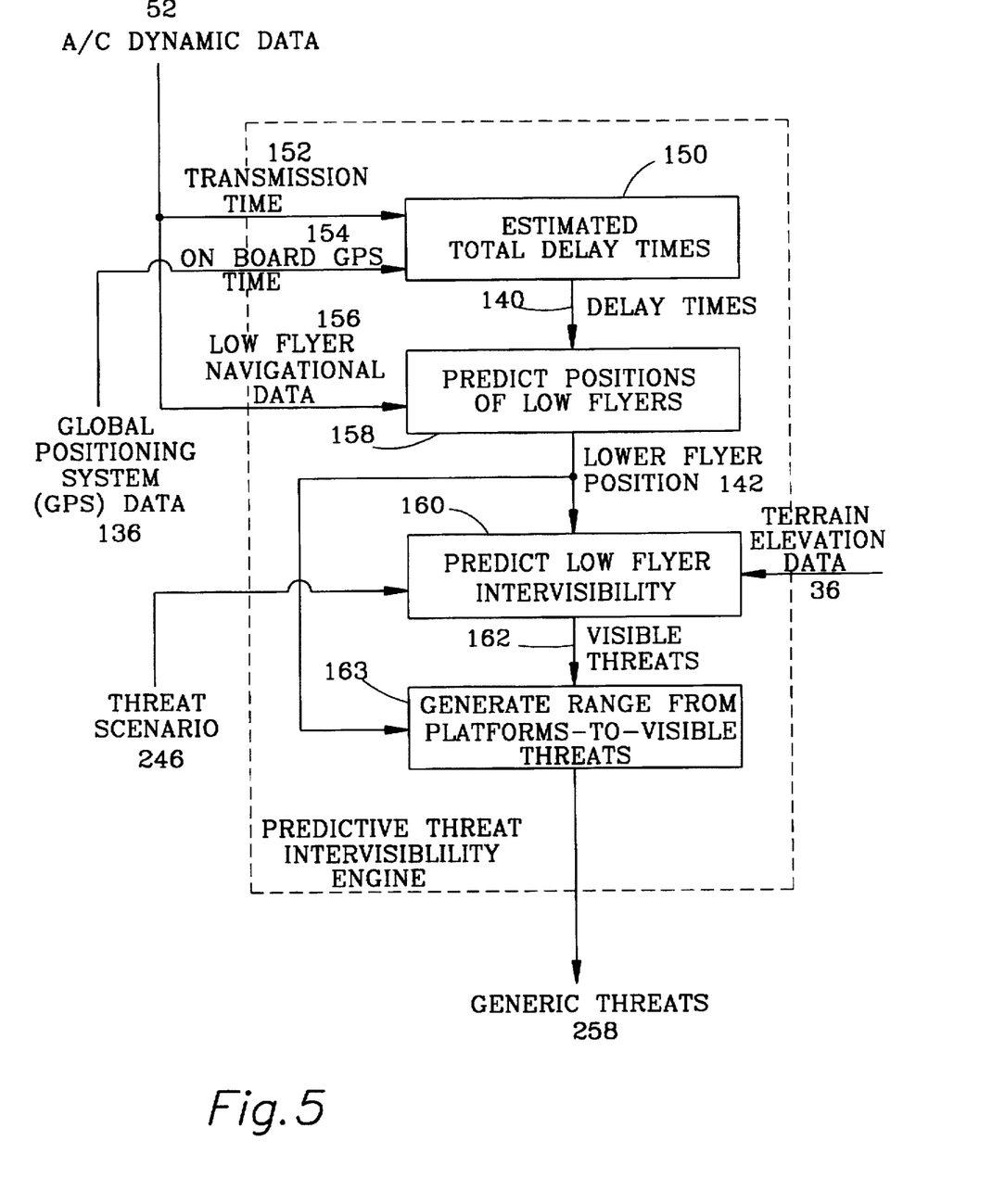
FIG. 5 is a block diagram depicting the preferred predictive threat intervisibility engine.

The preferred predictive threat intervisibility engine apparatus and method is shown in FIG. 5. Total delay times for transmission and receipt of data are estimated 150 from transmission time 152 from A/C dynamics data 52 and GPS data 136 via onboard GPS time 154. This provides total delay times 140 which represent processing time. The positions of low flyers are predicted 158 by using total delay times 140 with low flyer navigational data 156 transmitted to central training control by each low flyer player. From the delay time and aircraft dynamic data, the low flyer position 142 is projected forward in-time. Once the prediction of the low flyer position 142 is complete, it is processed along with threat scenario 246 and local terrain data 36 in the cache memory to ascertain visible threats 160 to each player aircraft. At this juncture the "line of sight" for each player is predicted to the threats. Visible threats 162 are inputted into the range generator from platforms to visible threats 163, which is processed with the predicted low flyer positions 142 to determine generic threats data 258.

Referring once again to FIG. 4, once a determination of visible threats or candidate active threat 162 is made for each player aircraft, based on the prediction from the threat intervisibility engine 112, the candidate active threats are determined. These are candidate active threats for each player based on a set of predetermined range considerations. Once the candidate threats within the range are determined, a determination of active threats based on models and tactics 164 is made. The active threats are then prioritized 166 based on predetermined prioritization rules for each player. The status of prioritized threats 168 is determined interactively to see if a threat is active, defeated or no longer in the "line of sight" from evasive measures taken from each player aircraft. The threat lists are updated 170 continuously. The updated threat list 170 is then formatted and packed for encoded transmission 172 to each player aircraft by the data link. The process also includes monitoring the training progress 174 of the entire training mission by the central training control to determine if the training mission is to continue or end.

The threat scenario is updated 176 interactively to include changing data such as the remaining threats and player aircraft. A display of the training mission is generated 178 by utilizing overlaid symbology for each uniquely identified player and threats over the terrain image. A scorecard is generated for each player 180 to determine if the player pilot has met a certain threshold level of success. If the training mission is over 182, the training process ends 184. If the training mission is to continue, the process is continuously repeated from this last step 182 up to the step of processing the input 110 data link until the end of the mission 184.

Figure 6:
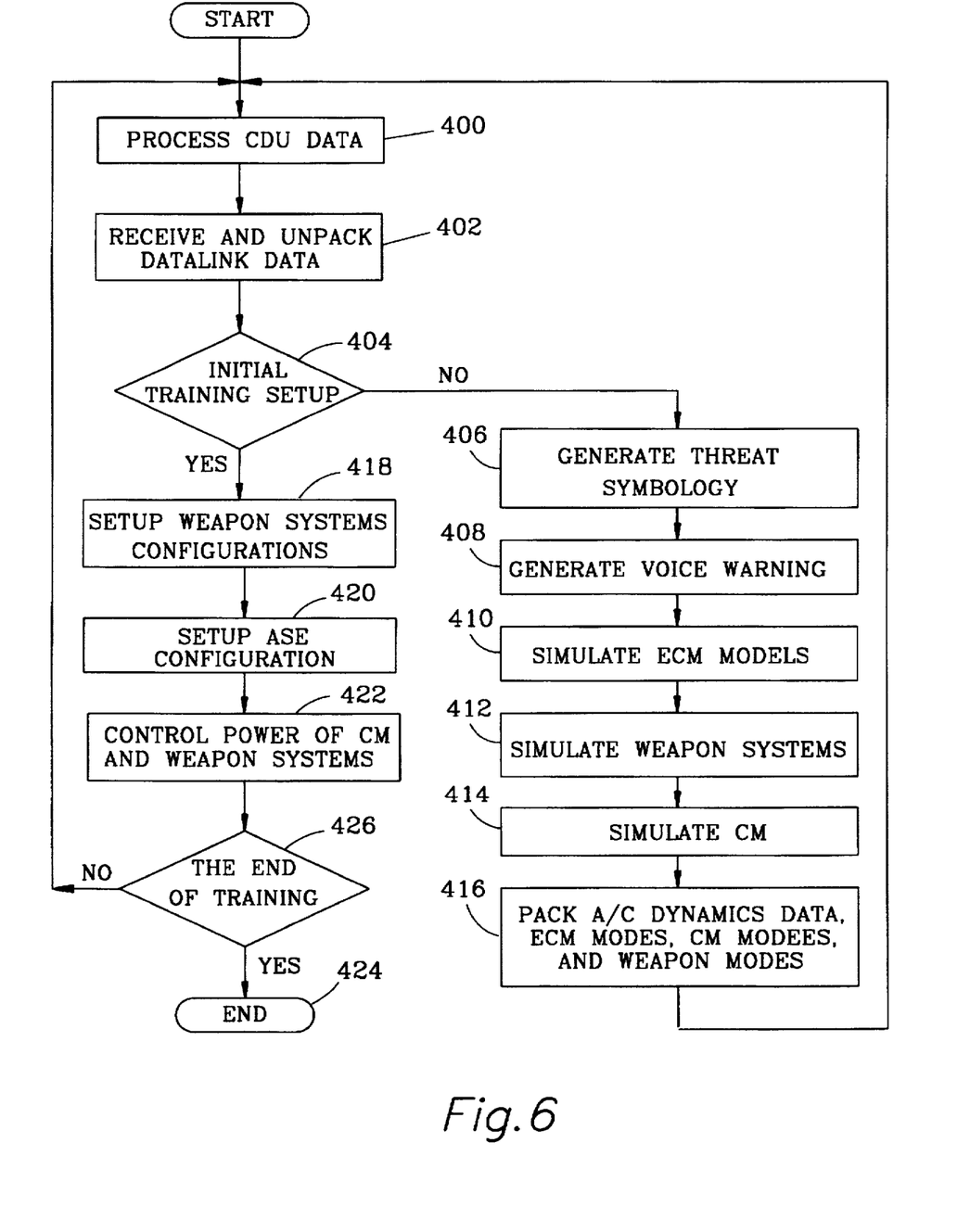
FIG. 6 is a flow chart of a player aircraft logic flow.

FIG. 6 is a flow chart of the preferred low flyer logic flow. In operation, CDU data is processed 400. This involves a redundant system to place the aircraft in training mission mode that is activated aboard the player aircraft. Data is received via data link and unpacked 402. Data received is the primary training mission initiation signal and simulated threat data. If the primary training mission initiation signal is present and not overridden by the redundant onboard system, the initial training is setup 404. If it is not the initial phase of the training exercise, the onboard computer generates the threat symbology display 406.

In addition to the visual display 406, audio voice warnings are generated 408. An example of these warnings are "MISSILE APPROACH" or tones generated for different type threats. These warnings are well known in the art. The simulate ECM models step 410, generates jamming techniques in response to active threats. Weapons systems are also simulated 412 as well as CM 414 from automatic or manual activation to counter threats. The positional data for the player aircraft, ECM model, CM model and simulated weapon mode data are packed 416 in encoded data packs and transmitted to central training control. If the initial training setup 404 is properly configured, CDU data is processed 400, data packets are received and unpacked 402 and the training weapons system configuration is set 418 to deactivate the actual weapons systems and activate the simulated systems. The ASE configuration is the setup 420 for the training exercise. This step configures the player aircraft for a training exercise and bypasses the operating systems for visual displays, audio warnings, ECM, CM and weapons systems to setup systems ready for training. This is provided by controlling power of CM and weapons systems 422 by the encoded data packets from the central control or CDU command entry. The final step of the process is the determination of the end of the training mission 424 signaling from the central computer. If the training mission is not over, the process continues. This determination is made by the central control. If the training mission is ended 324, the system configurations revert to normal.

This invention has been described herein in considerable detail in order to comply with the Patent Statutes and to provide those skilled in the art with the information needed to apply the novel principles and to construct and use such specialized components as are required. Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, and of the corresponding application(s), are hereby incorporated by reference.

The embodiments of the invention in which an exclusive property or right is claimed are defined as follows:

1. A method for ASE training, the method comprising the steps of:
   a) providing an airborne central training control, comprising the substeps of:
      i) creating simulated threat scenarios comprised of threat models, threat tactics and terrain data;
      ii) transmitting the simulated threat scenarios;
      iii) monitoring at least one player aircraft's reaction to said simulated threat scenarios; and
      iv) correlating positional data of said at least one player aircraft with the simulated threat scenarios utilizing a predictive threat intervisibility engine; and
   b) providing said at least one player aircraft, comprising the substeps of.
      i) receiving the simulated threat scenarios from said central training control apparatus; and
      ii) transmitting reactions of the at least one player aircraft.

2. The method of claim 1 further comprising prioritizing simulated threats for the at least one player aircraft.

3. The method of claim 1 wherein the step of providing the central training control comprises setting up the central training control and the at least one player aircraft for a training mission utilizing a training initialization apparatus.

4. The method of claim 1 wherein the step of providing a central training control comprises displaying a training situation.

5. The method of claim 4 wherein the step of displaying a training situation comprises overlaying display symbology of said at least one player aircraft's position, updated threats, and local terrain data.

6. The method of claim 1 wherein the step of providing a central training control comprises generating a training scorecard.

7. The method of claim 1 wherein the steps of monitoring and transmitting player aircraft reactions comprises monitoring and transmitting the at least one aircraft's dynamic position and measures initiated by the at least one player aircraft.

8. The invention of claim 7 wherein the measures initiated by said at least one player aircraft comprise simulated counter-measures, simulated electronic counter-measures and simulated weapons initiation.

9. A central training control apparatus for ASE training comprising:
   a mass memory unit comprising training data, terrain elevation data and threat tactic selection data;
   an input datalink means for receiving aircraft dynamic data, electronic countermeasures, counter-measures and weapons data from at least one player aircraft;
   a predictive threat intervisibility engine for correlating data from said mass memory unit and said input datalink for each player aircraft;
   a means for determining active threats for each player aircraft from said predictive threat intervisibility engine;
   means for prioritizing said active threats for each player aircraft;
   means for interactively updating said active threats by deleting defeated threats;
   an output data link for transmitting updated active threat data to each player aircraft;
   means for displaying a training situation; and
   a training scorecard generator.

10. The invention of claim 9 wherein said training data comprises ASE configuration and threat scenarios.

11. A training platform for player aircraft for an in-flight ASE training apparatus comprising:
   an input data link for receiving threat files and training setup data from an airborne central training control;
   means for displaying threats from said threat files;
   means for controlling power to counter-measure and weapons systems from said training setup data;
   means for setting up weapons systems configuration from said training setup data;
   means for simulating electronic counter-measure models from said training setup data;
   means for simulating weapons systems by said training setup data;
   means for simulating counter-measures; and
   an output data link for transmitting said simulated electronic counter-measure models, simulated weapons systems, simulated counter-measures and aircraft dynamic data from a player aircraft navigation system.

12. A method for centrally controlling ASE training, the method comprising the steps of:
   a) providing a mass unit comprising providing training data, terrain elevation data and threat tactic selection data;
   b) receiving aircraft dynamic data, electronic counter-measure, counter-measure and weapons data from each player aircraft via input data link;
   c) correlating data from the mass memory unit and the input datalink for each player aircraft comprising a predictive threat intervisibility engine;
   d) determining active threats for each player aircraft from the predictive threat intervisability engine;
   e) prioritizing the active threats for each player aircraft;
   g) interactively updating the active threats by deleting defeated threats;
   h) transmitting updated active threat data to each player aircraft via an output data link;

i) displaying a training situation; and j) generating a training scorecard.

13. The method of claim 12 wherein the step of providing training data comprises providing ASE configuration and threat scenarios.

14. A method for in-flight ASE training for player aircraft pilots, the method comprising the steps of:

a) receiving threat files and training setup data via input data link from an airborne central training control;

b) displaying threats from the threat files;

c) controlling power to counter-measure and weapons systems from the training setup data;

d) setting up weapons systems configurations from the training setup data;

e) simulating electronic counter-measure models from the training setup data;

f) simulating weapons systems by the training setup data;

g) simulating counter-measures; and h) transmitting the simulated electronic counter-measure models, simulated weapons systems, simulated counter-measures and aircraft dynamic data from a player aircraft navigation system.

15. An in-flight ASE training apparatus for multiple player aircraft comprising:

a central control apparatus comprising:
  a mass memory unit comprising:
    training data comprising a training initialization apparatus, ASE configuration and threat scenarios;
    digital terrain elevation data; and
    threat tactics comprising selected threat models and threat stratagem; and
  a player aircraft identification apparatus;
  an input data link comprising:
    player aircraft dynamic data; and
    training platform data comprising player aircraft evasive maneuvers, electronic counter-measures, counter-measures and weapon modes; and
  a predictive threat intervisibility engine for determining generic threats;
  an apparatus for determining active threats per player aircraft;
  an apparatus for prioritizing said active threats per player aircraft;
  an apparatus for updating active threats per player aircraft and for recording defeated threats;
  an output data link for transmitting encoded updated threats to each player aircraft, said ASE configuration and;
  a display symbology generator for generating symbology for a position of each player aircraft and updated threats;
  a training situation display for displaying overlaid symbology from said display symbology generator and said digital terrain elevation data; and
  a training scorecard generator for defeated threats for each player aircraft; and a training player platform for each player aircraft comprising:
  a player input data link comprising said updated threats and said ASE configuration,
  a power controller for controlling power to onboard player counter-measures and weapon systems by said input data link;
  a threat symbology generator for generating symbology for said updated threats via said input data link;
  an audio warning generator for generating audio warnings from said updated threats via said input data link;
  an electronic counter-measure model simulator initiated controlled by said ASE configuration;
  a weapons system simulator initiated by said ASE configuration and controlled by a weapon controller;
  a counter-measure simulator initiated and controlled by a counter-measure controller; and
  a player output data link for transmitting electronic counter-measure mode data from said electronic counter-measure model simulator, weapons systems mode data from said weapons systems generator, counter-measure mode data form counter-measure simulator and aircraft dynamics data from said player aircraft navigation system.

* * * * *